US011109581B2

(12) United States Patent
Langley et al.

(10) Patent No.: US 11,109,581 B2
(45) Date of Patent: Sep. 7, 2021

(54) CONTAINER FOR VERTICALLY STORING CRANKBAIT FISHING LURE

(71) Applicant: Mafia Outdoors, LLC, Russellville, AR (US)

(72) Inventors: J. Barton Langley, Russellville, AR (US); Jeremy S. Starks, Scott Depot, WV (US)

(73) Assignee: Mafia Outdoors, LLC, Russellville, AR (US)

( * ) Notice: Subject to any disclaimer, the term of this patent is extended or adjusted under 35 U.S.C. 154(b) by 310 days.

(21) Appl. No.: 15/644,332

(22) Filed: Jul. 7, 2017

(65) Prior Publication Data

US 2018/0007882 A1 Jan. 11, 2018

Related U.S. Application Data

(60) Provisional application No. 62/360,154, filed on Jul. 8, 2016.

(51) Int. Cl.
| | | |
|---|---|---|
| *A01K 97/06* | (2006.01) | |
| *B65D 25/04* | (2006.01) | |
| *B65D 43/16* | (2006.01) | |
| *B65D 43/22* | (2006.01) | |

(52) U.S. Cl.
CPC .............. *A01K 97/06* (2013.01); *B65D 25/04* (2013.01); *B65D 43/163* (2013.01); *B65D 43/22* (2013.01)

(58) Field of Classification Search
CPC ...................................................... A01K 97/06
USPC ........................ 43/54.1; 206/315.11; 224/922
See application file for complete search history.

(56) References Cited

U.S. PATENT DOCUMENTS

| | | | | | |
|---|---|---|---|---|---|
| 2,220,817 | A * | 11/1940 | Holmes | ................... | A01K 97/06 43/57.1 |
| 2,364,807 | A * | 12/1944 | Nelson, Jr. | .............. | A01K 97/06 43/57.1 |
| 2,510,643 | A * | 6/1950 | Long | ......................... | A45C 5/00 190/28 |
| 2,550,039 | A * | 4/1951 | Carlson | ................... | A01K 97/06 43/57.1 |
| 2,711,050 | A * | 6/1955 | McIntyre | ................ | A01K 97/06 43/57.1 |
| 3,182,872 | A * | 5/1965 | Brosseau | ................ | A01K 97/06 224/610 |
| 3,350,810 | A * | 11/1967 | Warner | ................... | A01K 97/06 43/57.1 |
| 3,484,980 | A * | 12/1969 | Wait | ........................ | A01K 97/06 43/57.1 |
| 3,780,468 | A * | 12/1973 | Maffett | ................... | A01K 97/06 43/54.1 |

(Continued)

FOREIGN PATENT DOCUMENTS

| | | | | |
|---|---|---|---|---|
| CA | 2480926 A1 * | 3/2005 | .............. | A01K 97/06 |
| DE | 3527214 A1 * | 2/1986 | .............. | A01K 97/06 |

(Continued)

*Primary Examiner* — Darren W Ark
(74) *Attorney, Agent, or Firm* — Richard Blakely Glasgow

(57) ABSTRACT

A durable and waterproof crankbait storage container having a number of individual internal storage compartments within a main storage compartment. The walls of the individual internal storage compartments are slidably removable from the main storage compartment and each of the individual storage compartments can store a single crankbait fishing product in a vertical position.

8 Claims, 4 Drawing Sheets

(56) References Cited

U.S. PATENT DOCUMENTS

| | | | |
|---|---|---|---|
| 3,797,161 A * | 3/1974 | Smallwood | A01K 97/06 43/57.1 |
| 4,006,553 A * | 2/1977 | Porter | A01K 97/06 43/54.1 |
| 4,023,304 A * | 5/1977 | Singer | A01K 97/06 43/54.1 |
| 4,353,182 A * | 10/1982 | Junkas | A01K 97/06 206/315.11 |
| 4,403,483 A * | 9/1983 | Lisalda | A01K 97/04 62/457.1 |
| 4,499,997 A * | 2/1985 | Swingley, Jr. | B65D 21/0219 206/427 |
| 4,589,546 A * | 5/1986 | Sunderland | A01K 97/06 206/315.1 |
| 4,691,469 A * | 9/1987 | Alsobrook | A01K 97/06 43/54.1 |
| 4,729,474 A * | 3/1988 | Lanius | A01K 97/06 206/315.1 |
| 4,756,412 A * | 7/1988 | Graves | A01K 97/06 206/315.11 |
| 4,759,148 A * | 7/1988 | Love | A01K 97/04 220/23.89 |
| 4,768,651 A * | 9/1988 | Lanius | A01K 97/06 206/315.1 |
| 4,770,327 A * | 9/1988 | Fortson | A01K 97/06 43/54.1 |
| 4,813,173 A * | 3/1989 | Abbotoy | A01K 97/06 206/315.11 |
| 4,825,584 A * | 5/1989 | Raley | A01K 97/06 43/57.1 |
| 4,827,658 A * | 5/1989 | Wolniak | A01K 97/06 43/54.1 |
| 4,936,044 A * | 6/1990 | Bruce | A01K 97/06 43/57.1 |
| 4,972,625 A * | 11/1990 | Barnes | A01K 97/06 206/315.11 |
| 5,054,669 A * | 10/1991 | Zimbardi | A01K 97/06 190/118 |
| 5,185,952 A * | 2/1993 | Bruce | A01K 97/06 206/315.11 |
| 5,261,561 A * | 11/1993 | Hodges, Jr. | B65D 25/00 206/315.11 |
| 5,272,830 A * | 12/1993 | Levin | A01K 97/20 224/920 |
| 5,289,940 A * | 3/1994 | Wisenbaugh | A01K 97/06 206/315.1 |
| 5,311,698 A * | 5/1994 | Plost | A01K 97/06 224/235 |
| 5,392,557 A * | 2/1995 | Harmon | A01K 97/06 206/315.11 |
| 5,560,145 A * | 10/1996 | Anderson | A01K 97/06 403/373 |
| 5,606,820 A * | 3/1997 | Suddeth | A01K 97/06 206/315.11 |
| 5,813,528 A * | 9/1998 | Bliek | A01K 97/06 206/315.11 |
| 5,957,321 A * | 9/1999 | Jones | A01K 97/26 206/315.11 |
| 5,996,273 A * | 12/1999 | George | A01K 97/06 43/54.1 |
| 6,550,629 B1 * | 4/2003 | Pfister | A01K 97/04 220/507 |
| 6,679,377 B2 * | 1/2004 | Maddox | A01K 97/06 43/54.1 |
| 6,953,128 B2 * | 10/2005 | Pfister | A01K 97/04 220/507 |
| 7,305,793 B1 * | 12/2007 | Macdonald | A01K 97/06 206/315.11 |
| 7,328,813 B2 * | 2/2008 | Pfister | A01K 97/04 220/507 |
| 7,552,560 B2 * | 6/2009 | Hoover | A01K 97/06 206/315.11 |
| 7,621,074 B2 * | 11/2009 | Glidewell | A01K 97/06 43/57.1 |
| 8,016,106 B2 * | 9/2011 | Schmitt | A01K 97/06 206/315.11 |
| 9,723,826 B2 * | 8/2017 | Murray | A45F 5/02 |
| 9,877,469 B1 * | 1/2018 | Diaz | A01K 97/06 |
| 9,883,665 B2 * | 2/2018 | Heaton | A01K 97/06 |
| 10,617,107 B2 * | 4/2020 | Murar | A01K 97/06 |
| 2006/0042152 A1 * | 3/2006 | Pearson | A01K 97/06 43/54.1 |
| 2007/0011939 A1 * | 1/2007 | Sakai | A01K 97/06 43/54.1 |
| 2007/0132253 A1 * | 6/2007 | Santayana | A01K 97/06 294/2 |
| 2008/0067206 A1 * | 3/2008 | Kuhn | A01K 97/06 224/406 |
| 2009/0044442 A1 * | 2/2009 | Ryckman | A01K 97/06 43/54.1 |
| 2013/0326930 A1 * | 12/2013 | Reyes | A01K 97/04 43/54.1 |
| 2014/0033602 A1 * | 2/2014 | Gesik | A01K 97/06 43/57.1 |
| 2016/0295847 A1 * | 10/2016 | McKinstry | A01K 97/06 |
| 2018/0007884 A1 * | 1/2018 | Langley | A01K 97/06 |
| 2018/0343844 A1 * | 12/2018 | Aston | A01K 97/06 |
| 2019/0000058 A1 * | 1/2019 | Murar | A01K 97/06 |
| 2019/0133103 A1 * | 5/2019 | Erickson | A01K 97/06 |
| 2021/0185995 A1 * | 6/2021 | Morash | B65D 25/04 |

FOREIGN PATENT DOCUMENTS

| | | | | |
|---|---|---|---|---|
| GB | 619164 A | * | 3/1949 | A01K 97/06 |
| JP | 07227187 A | * | 8/1995 | |
| JP | 09140307 A | * | 6/1997 | |
| JP | 10178998 A | * | 7/1998 | |
| JP | 10327729 A | * | 12/1998 | |
| JP | 11009165 A | * | 1/1999 | |
| JP | 2000032892 A | * | 2/2000 | |
| JP | 2000157133 A | * | 6/2000 | |
| JP | 2001287743 A | * | 10/2001 | |
| JP | 2002034414 A | * | 2/2002 | |
| JP | 2003199468 A | * | 7/2003 | |
| JP | 2003289778 A | * | 10/2003 | |
| JP | 2005204552 A | * | 8/2005 | |
| JP | 3158680 U | * | 4/2010 | |
| JP | 2016119905 A | * | 7/2016 | |

* cited by examiner

CONTAINER FOR VERTICALLY STORING CRANKBAIT FISHING LURE

CROSS-REFERENCE TO RELATED APPLICATIONS

This application claims the benefit of U.S. Provisional Patent Application No. 62/360,154, entitled "Crankbait Storage Box" and filed on Jul. 8, 2016. The complete disclosure of said provisional application is hereby incorporated by reference.

STATEMENT REGARDING FEDERALLY SPONSORED RESEARCH OR DEVELOPMENT

Not applicable

BACKGROUND OF THE INVENTION

Recreational fishing is an activity enjoyed by tens of millions of people each year. In fact, some reports estimate that nearly forty-six million Americans participate in fishing activities in any given year. An average fishing participant is estimated to fish approximately 19.4 outings per year, with total combined fishing outings estimated at approximately 893 million times per year. While many of these fishermen cite the rush of catching a fish, the joys of the sights and sound of nature, and spending time with family as the best things about fishing, many fishermen say that one of the worst things about fishing is not having the right equipment.

Fishing tackle, a broad term used to refer to the equipment or gear used for catching fish, is essential for successful fishing. One of the most commonly used lures, particularly for bass fishing, is a crankbait. While there are a number of variations in size, shape, and colors of crankbaits, crankbaits are designed with a shape that enables them to dive and stay underwater, typically via a flat lip on the front. While crankbaits are all generally used for the same purposes, the differences in shapes, sizes, colors, and other variations can make all the difference when it comes to leaving the fishing trip with a fish or going home empty handed. It is desirable to pick a crankbait that closely resembles the type of live-bait that the fish in that area are feeding on during that time of year. For this reason, it is necessary for a fisherman to travel with a large number of crankbaits with varying styles, shapes, colors, and designs. Because of the volume of crankbaits needed for any given fishing trip, storage boxes are a vital piece of equipment for people who engage in fishing activities.

Crankbait boxes have existed in their current state for decades, with the overall design of crankbait boxes being considerably the same for nearly 30 years. These current storage boxes require baits to be stored horizontally together in compartments designed to hold multiple baits. This often leads to baits becoming entangled with one another and may also lead to baits becoming rusted. Furthermore, current crankbait boxes are made from polypropylene and are not durable, which ultimately leads to the boxes breaking when loaded with heavy baits. It is desired to have a storage container that overcomes these drawbacks of current crankbait boxes.

DETAILED DESCRIPTION OF THE INVENTION

Figure 1:
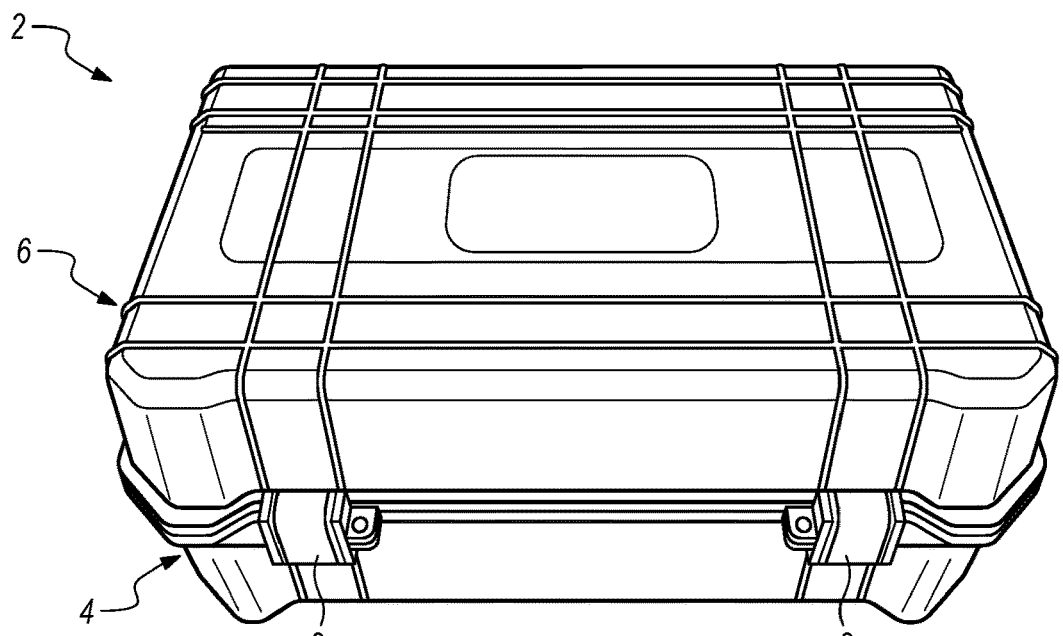
FIG. 1 is a perspective view of the crankbait storage container of the present invention in a closed position.

The present invention is directed to fishing products and more particular to a durable storage container for holding a quantity of fishing lures. While the preferred embodiment of the present invention is configured to store crankbait variety fishing lures, it is understood that any variety of baits may be used with the storage container described herein. While the preferred embodiment has a depth sufficient to store 6XD and 8XD size crankbaits, it is understood that modifications can be made to the depth of the container to store other size crankbaits.

With reference to FIGS. 1-6, the preferred embodiments of the storage container of the present invention may be described. The storage container 2 is made up of a bottom compartment section 4 and a lid 6. The compartment section 4 has outer walls (a left side wall 10, a front side wall 12, a right side wall 14, and a back side wall 16) and a bottom surface 28 connecting the bottom of the outer walls 10, 12, 14, 16 to form an internal compartment having a depth corresponding to the height of the outer walls 10, 12, 14, 16. The internal compartment has a number of internal walls, a subset of which run parallel to the front and back outer walls (lengthwise walls 20) and a subset of which run parallel to the left and right outer walls (widthwise walls 22). These internal walls 20, 22 intersect at various points to create a number of smaller, individual compartments inside the main internal compartment. In one embodiment, the front side outer wall 12 is connected to the left side wall 10 and right side wall 14 with chamfered corners. These chamfered corners not only aid in the aesthetic appeal of the crankbait storage box 2, but also make the box stronger and more durable.

Figure 2:
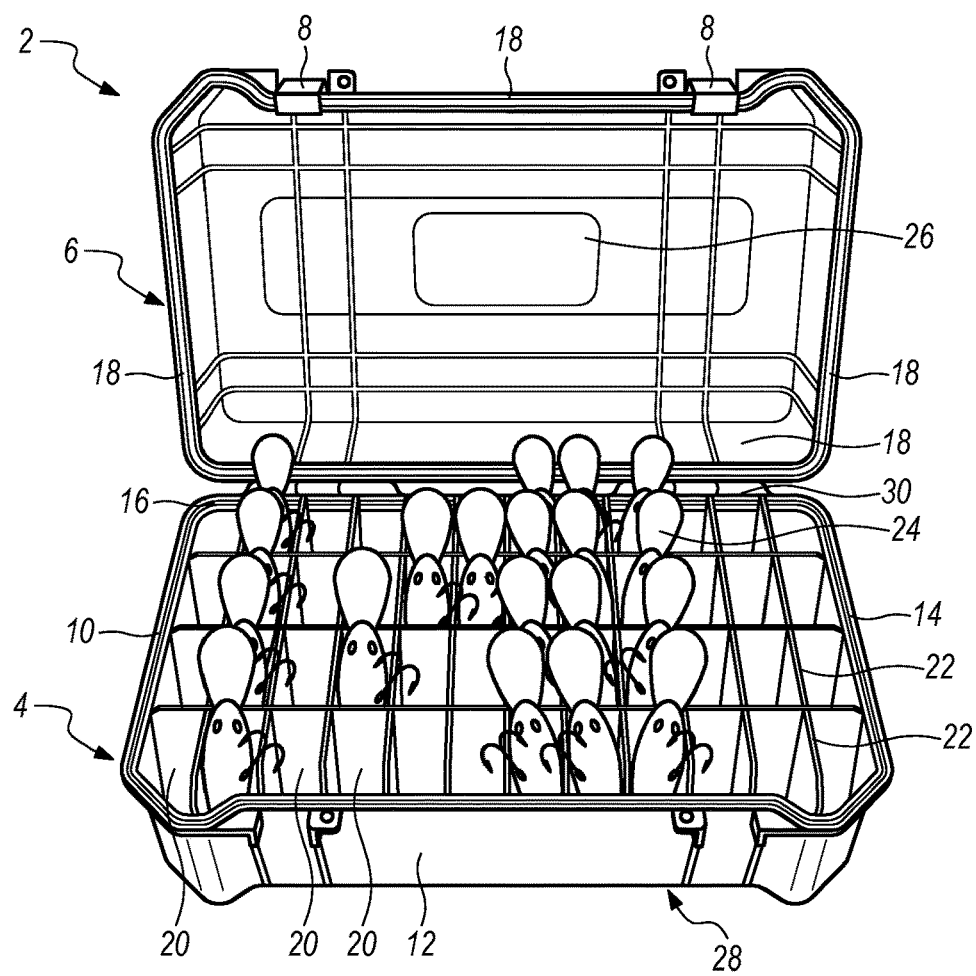
FIG. 2 is a perspective view of the crankbait storage container of the present invention in an open position and containing bait.
Figure 3:
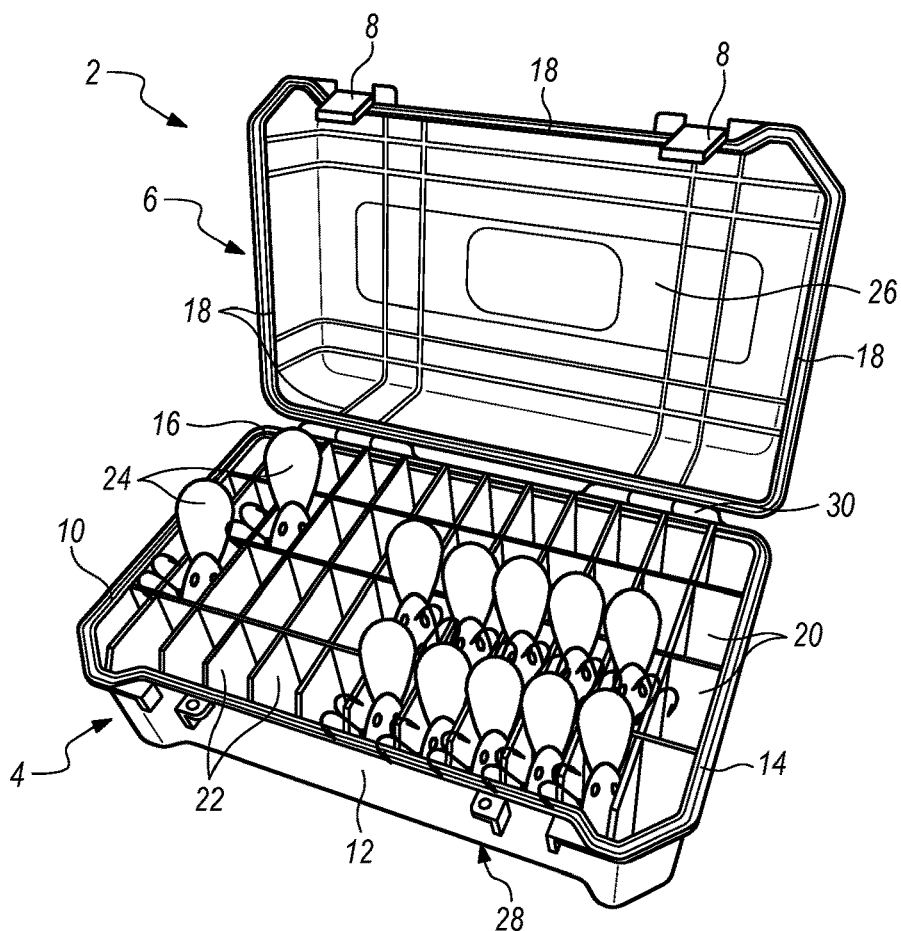
FIG. 3 is a perspective view of the crankbait storage container of the present invention in an open position and containing bait.
Figure 4:
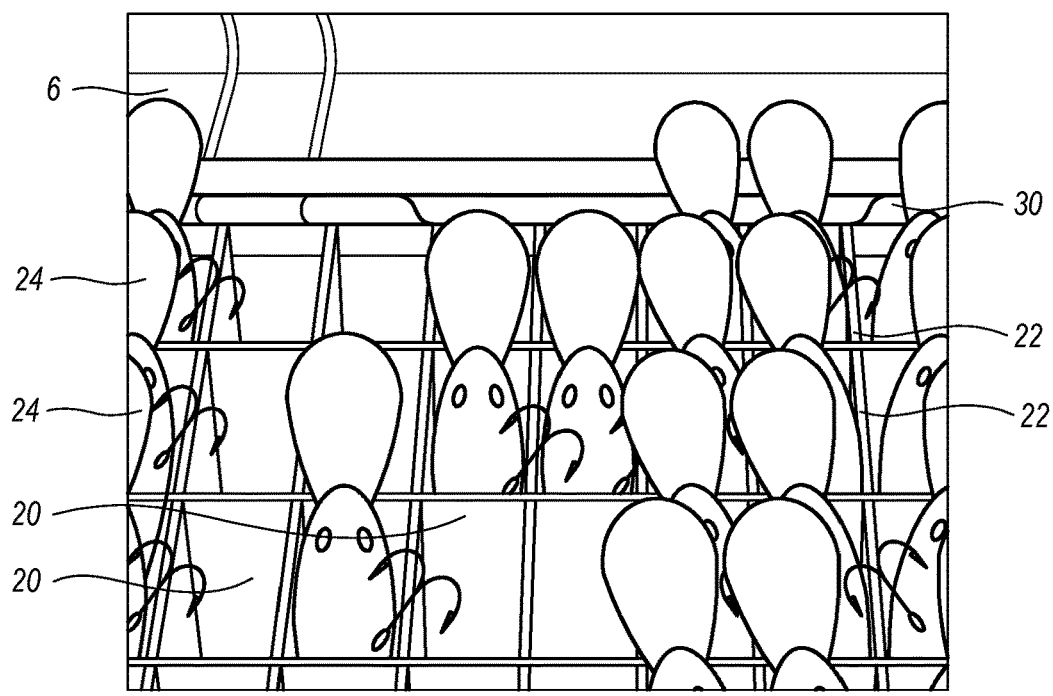
FIG. 4 is a zoomed in perspective view of the crankbait storage container of the present invention showing the crankbait stored vertically in individual compartments.
Figure 5:
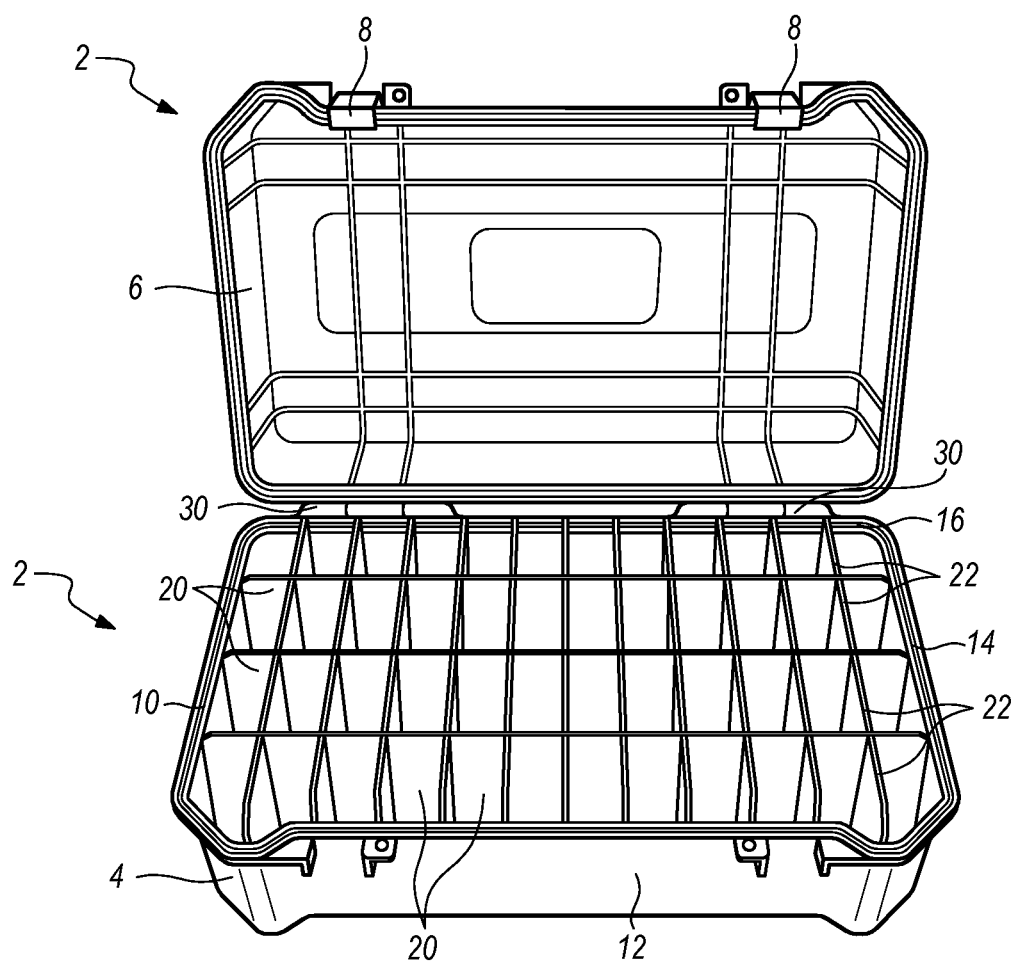
FIG. 5 is a perspective view of the crankbait storage container of the present invention in an open position without bait.

The internal walls 20, 22 preferably are the same height as the outer walls 10, 12, 14, 16 such that the individual internal compartments have substantially the same depth as the main internal compartment. Each of these individual compartments inside the main internal compartment is configured to hold a single crankbait 24, as shown in FIGS. 2-4. The individual compartments are configured to receive and store the crankbait 24 in the vertical position to prevent baits 24 from being tangled. The individual compartments are sized to allow the user to easily see each bait 24 when trying to choose a color, shape, or design appropriate for his or her fishing needs. Furthermore, because each individual compartment holds a single bait 24, the baits 24 are protected from damage because they do not come in contact with other baits 24.

Figure 6:
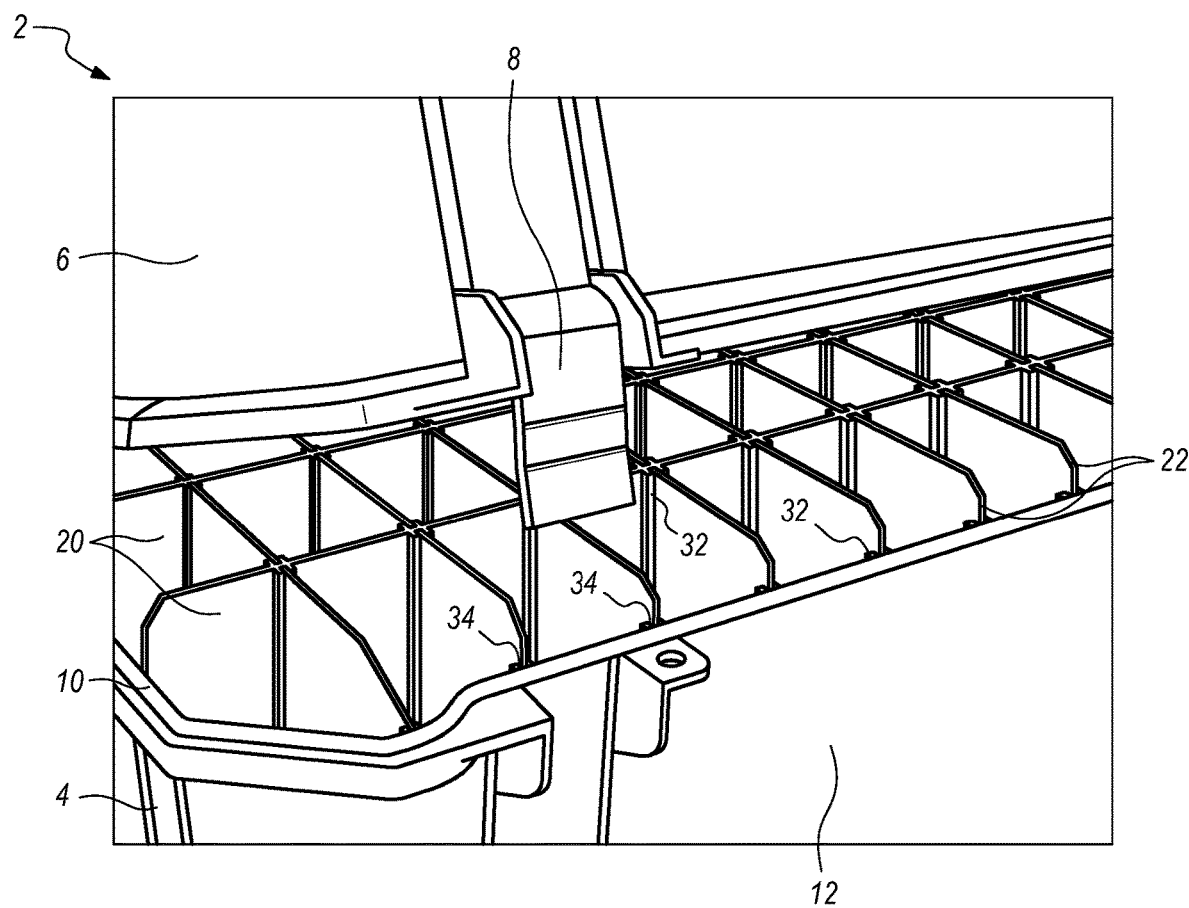
FIG. 6 is a zoomed in perspective view of the crankbait storage container of the present invention, showing an embodiment of the locking piece.

In one embodiment, a number of the internal walls (for example the widthwise walls 22 running perpendicular to the front wall 12 and back wall 16 of the compartment section 4) may be slidably removed from the container 2 to create individual internal compartments of varying sizes. In order to allow the internal walls to be secured to and removed from the compartment section 4 of the container 2, the internal walls may, for example, contain notches 32 and grooves 34 to facilitate the removable sliding of the internal walls, as shown in FIG. 6. For example, in one embodiment, the lengthwise internal walls 20 may contain a number notches 32 spaced apart down the length of the wall 20. These notches 32 are designed to receive the removable widthwise walls 22. Furthermore, the widthwise walls 22 may contain grooves 34 on their ends such that are capable of being slid in and out of the notches on the lengthwise walls 20. The inside surface of the outer lengthwise walls (i.e. the front wall 12 and the back wall 16) may also have notches 32 for receiving the widthwise internal walls 22. These notches 32 (and those on the lengthwise internal walls 20) are designed such that the grooved ends 34 of the widthwise walls 22 slide into the notches 32, which in turn hold the widthwise walls 22 in a vertical position, thus creating the internal compartments.

In order to modify the number, size, and spacing of the individual internal compartments, the container is designed such that any number of internal walls may be removed from these notches. For example, a widthwise wall may be placed in every notch, thus creating a number of substantially equal sized individual compartments. Alternatively, half of the container may have widthwise walls in every notch and another half of the container may have widthwise walls in every third notch. In such a scenario, half of the container would have smaller individual compartments while the other half would have longer individual compartments. The size of the individual compartments can be modified to fit any fishing need by removing or adding the internal walls in any combination. Furthermore, while the example given herein refers to the lengthwise walls 20 having notches and the widthwise walls 22 being removable, it is understood that in one embodiment the lengthwise walls 20 are the removable walls and the widthwise walls 22 are stationary and have notches.

The lid 6 acts as the top surface of the storage container 2 to allow the storage container 2 to be transported without losing the contents of the compartment section 4. The lid 6 preferably has outer walls 18 and a top surface 26 connecting the top of outer walls 18 to form a lid 6 having a depth. The lid 6 is configured to be open and closed, thus allowing the user to access the contents of the compartment 4 when the lid 6 is open. Closing the lid 6 secures the crankbaits 24 in place, keeping them from being damaged. In the preferred embodiment, the lid 6 is hingedly attached by a hinge 30 to one of the outer walls of the compartment section 4, and more preferably to the back side wall 16. The lid 6 is attached to the back side wall 16 of the storage compartment 4 by securing, via a hinge 30, one of the outer walls 18 of the lid 16 to the back wall 16 of the compartment section 4. This allows the lid 6 to be opened and closed while remaining connected to the compartment section 4 of the storage container 2. In one embodiment, the storage container 2 is fitted with two secure-locking latches 8 on opposite ends of front outer walls 18 of the lid 6 and front side wall 12 of compartment section 4. These latches 8 are located near the bottom of the front outer wall 18 of the lid 6 and the top of the front side wall 12 of the compartment section 4 such that the lid 6 may be securely latched in a closed position to the compartment section 4. The lid 6 preferably has a set of raised, perpendicular lines on its top surface. These intersecting lines not only add to the aesthetic appeal of the container 2 but also make the container 2 stronger and more durable and add to the crush-resistance of the container 2.

The internal depth of the lid 6 leaves room for the ends of the baits 24 to extend above the walls 20, 22 of the individual compartments (as shown in FIGS. 2-4). This not only protects the baits 24 from damage, but also serves to keep the baits 24 in place when the lid 6 is closed because the upper portion of the bait 24 extending above the internal walls 20, 22 (and therefore extending beyond the depth of the main storage compartment 4 into the depth of the lid 6) comes into contact with the top surface 26 of the lid 6. This allows the container 2 to be stored in any position including upside down on the stop surface 26 of the lid 6 while still keeping the contents 24 in place, which ultimately reduces or eliminates bait damage and the tangling of baits 24.

While the preferred embodiment of the storage container of the present invention is approximately 14.9 inches long (length of front side wall 12 and backside wall 16), 9.3 inches wide (length of left side wall 10 and right side wall 14), 6.5 inches deep (height of walls 10, 12, 14, 16), and features forty-four or forty-eight individual internal compartments, it is understood that the number of individual compartments may be modified by changing size of container, which may be achieved by modifying the lengths of the side walls 10, 12, 14, 16. Furthermore the sizing of the individual compartments may be changed to modify the container for different size crankbaits 24 by the positioning and number of internal walls. However, in the preferred embodiment, the internal compartments are specifically designed to hold deep diving crankbaits 24 of 6XD and 8XD sizes.

The storage container 2 is preferably made from acrylonitrile butadiene styrene (ABS) and is extremely durable and rust resistant. Furthermore, in the preferred embodiment, the storage container 2 uses an O-ring seal to waterproof the container 2 and keep water from entering the container 2, which reduces or eliminates the likelihood of crankbait 24 rusting. The O-ring is preferably integral to the lid 6 and is configured to be pressed into an edge or lip of the bottom container section 4, thereby providing a waterproof seal. Furthermore, because of the use of ABS material in addition to this waterproofing, the storage container 2 is configured to float, even when fully loaded with crankbaits 24 or other devices.

The present invention has been described with reference to certain preferred and alternative embodiments that are intended to be exemplary only and not limiting to the full scope of the present invention.

We claim:

1. A storage container for a crankbait fishing lure, the storage container comprising:
   a. a front wall;
   b. a back wall opposite the front wall;
   c. a first side wall connecting the front wall and the back wall;
   d. a second side wall connecting the front wall and the back wall;
   e. a bottom surface connected to the first side wall, the second side wall, the front wall, and the back wall to form a first compartment, wherein the first compartment comprises an upper perimeter;
   f. a lid, wherein the lid has an open position and a closed position, wherein the lid comprises a second compartment formed by a plurality of lid walls and a top lid surface, wherein the second compartment comprises a lower perimeter;

g. a first lengthwise divider and a second lengthwise divider extending between the first side wall and the second side wall; and h. a first widthwise divider and a second widthwise divider extending between the front wall and the back wall, wherein the first and second lengthwise dividers and the first and second widthwise dividers form a sub-compartment in the first compartment, wherein the sub-compartment vertically receives a crankbait fishing lure such that a bill of the crankbait fishing lure extends above the first and second lengthwise dividers and the first and second widthwise dividers and out of the first compartment into the second compartment when the lid is in the closed position, wherein the upper perimeter of the first compartment faces the lower perimeter of the second compartment when the lid is in the closed position.

2. A storage container for a crankbait fishing lure, the storage container comprising:

a. a front wall;

b. a back wall opposite the front wall;

c. a first side wall connecting the front wall and the back wall;

d. a second side wall connecting the front wall and the back wall;

e. a bottom surface connected to the first side wall, the second side wall, the front wall, and the back wall to form a first compartment, wherein the first compartment comprises an upper perimeter;

f. a lid attached to the back wall, wherein the lid has an open position and a closed position, wherein the lid comprises a second compartment formed by a plurality of lid walls and a top lid surface, wherein the second compartment comprises a lower perimeter;

g. a plurality of lengthwise dividers extending between the first side wall and the second side wall; and h. a plurality of widthwise dividers extending between the front wall and the back wall, wherein the plurality of lengthwise dividers and the plurality of widthwise dividers form a plurality of sub-compartments in the first compartment, wherein at least one of the plurality of sub-compartments vertically receives a crankbait fishing lure such that a bill of the crankbait fishing lure extends above the plurality of lengthwise dividers and the plurality of widthwise dividers into the second compartment when the lid is in the closed position, wherein the upper perimeter of the first compartment faces the lower perimeter of the second compartment when the lid is in the closed position.

3. The storage container of claim 2, wherein the lid is hingedly attached to the back wall.

4. The storage container of claim 2, further comprising a plurality of latches connected to the lid.

5. The storage container of claim 2, wherein the plurality of widthwise dividers are slidably removable.

6. The storage container of claim 2, wherein the plurality of lengthwise dividers are slidably removable.

7. The storage container of claim 2, wherein each of said plurality of lengthwise dividers comprises a notch.

8. The storage container of claim 2, wherein each of said plurality of widthwise dividers comprises a groove.

* * * * *